Jan. 10, 1956     C. E. STOOPS     2,730,405

SPRAYING DEVICE

Filed July 14, 1952

INVENTOR
*Clyne E. Stoops*

BY *Gardner & Zimmerman*
ATTORNEYS

United States Patent Office 2,730,405
Patented Jan. 10, 1956

2,730,405

SPRAYING DEVICE

Clyne E. Stoops, Hayward, Calif.

Application July 14, 1952, Serial No. 298,718

8 Claims. (Cl. 299—144)

This invention relates to spraying devices, and more particularly to a new type of spray nozzle for directing a stream of material towards leaves, bushes or other vegetation.

Devices of this general nature are well known and have been widely used for treating flowers or other plants by spraying various compounds on the petals, leaves or other portions of the plant being sprayed. However, such devices possess certain disadvantages or shortcomings which limits their effectiveness. Primarily, the trouble with the prior art devices is that they are not capable of spraying the entire outer surface of a plant unless the operator takes extreme precautions to direct the spray nozzle in all directions.

Accordingly, it is an object of the present invention to provide a spray device in which the material being emitted therefrom may be directed in a plurality of directions whereby heretofore inaccessible portions of a plant or the like may be sprayed.

Another object of my invention is to provide a unitary spray device incorporating a plurality of individual spray nozzles, each being disposed to discharge a spray of material in a direction different from that of another of such nozzles.

A further object of the invention is to provide a device of the nature referred to in which each of the spray nozzles may be separately controlled whereby selected nozzles may be placed in or out of operation.

A still further object of the invention is to provide a spray device of the character described which is particularly well adapted for insertion in relatively dense foliage.

Yet another object of my invention is to provide a spray nozzle of the type referred to wherein relatively few operating parts are required so that its cost of manufacture and assembly is substantially reduced to a minimum, and so that the likelihood of defective operation is practically eliminated.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing.

Figure 1:
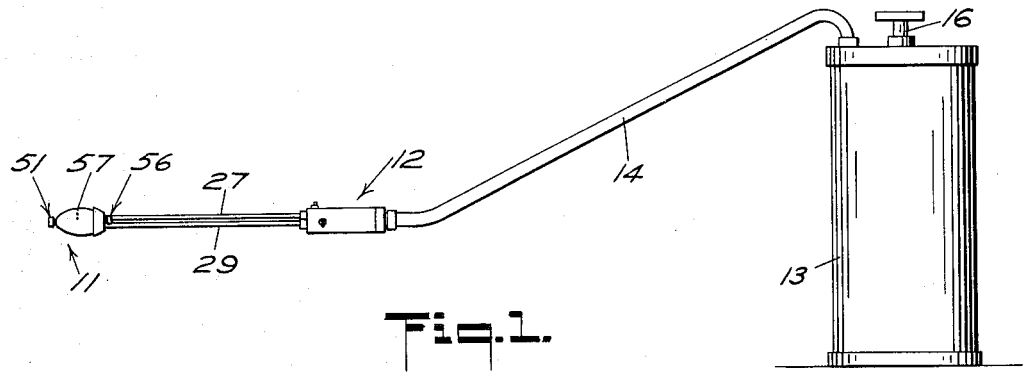
Figure 1 is a side elevational view showing my new spraying device in operative connection with a source of supply.

The spraying device of the present invention generally includes a spray head 11 and a combination handle and actuating mechanism 12, the latter being adapted to be placed in flow communication with any suitable source of spray material. As here shown, such source includes a tank 13 having a discharge hose 14 secured thereto, the contents of the tank being under pressure by means of a manually operable pump 16 disposed on the tank top. This type of container is well known in the art and forms no independent part of the present invention.

The hose end remote from its connection with tank 13 is provided with a coupling element 17 arranged to threadedly receive the distal end 18 of the spraying device handle 12. The handle is preferably of cylindrical shape and includes a bore or chamber 19 in communication with the bore of hose 14. Material entering chamber 19 under pressure from tank 13 is directed into three circumferentially spaced passages designated by the numerals 21, 22 and 23 respectively, each of these passages opening into chamber 19 at the rear ends thereof.

Mounted on the front end 24 of the handle, and in axial alignment with each of the respective passages, are a plurality of externally threaded tubular elements 26. These elements are arranged to engage the ends of preferably rigid conduits designated 27, 28 and 29 respectively, each of such conduits having an annular shoulder 31 adjacent the ends thereof disposed in abutting relation to the adjacent element end and secured thereto by means of an internally threaded coupling 32 provided with a radial inwardly extending shoulder 33 for locking the respectively aligned elements and conduits in flow communication.

Fluid, or other material passing through the handle and into the various conduits is led into the aforementioned spraying device 11, which, as here shown, includes an outer casing 36 of general bullet-like cross-sectional form, so as to facilitate the introduction thereof into relatively dense foliage. The rear end of casing 36 is threaded as indicated at 37 to receive a cap member 38 forming a generally flat rear closure for the casing. As will be noted, member 38 is provided with a plurality of apertures 39 to receive the respective conduits whereby material contained therein may be discharged into the casing 36.

As hereinabove mentioned, the primary object or feature of advantage of my spraying device is its ability to eject the spray material in one or more selected directions without requiring compensating repositioning of the device. Accordingly, the interior of casing 36 is divided into a plurality of chambers 41, 42 and 43, the terminal ends of the conduits 27, 28 and 29 being disposed in such chambers respectively. The chambers may be conveniently defined by means of a pair of spaced baffle plates 44 and 46 substantially parallel to each other and to rear cap 38, and being set in annular U-shaped resilient gaskets 47 which may be secured to the inner wall of the casing in any suitable manner such as by providing grooves 48 therefor. It will also be understood that plate 46 must receive both conduit 27 and 28.

Each of the chambers is provided with discharge means arranged in angularly related positions. For purpose of identification and explanation, the chamber 41 may be referred to as the bottom chamber, for in the majority of hand spray operations the device will be held in a generally vertically downward position. I therefore provide a bottom spray nozzle 51 secured to the nose end of casing 36, such nozzle, as here shown, merely comprising a nipple 52 to the outer end of which an apertured plate 53 may be secured by a coupling 54 so as to eject the spray material in a somewhat atomized condition.

Figure 2:
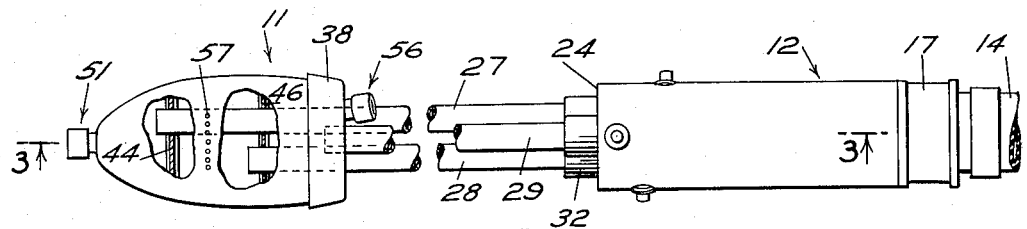
Figure 2 is an enlarged side elevational view of the spraying device.
Figure 3:
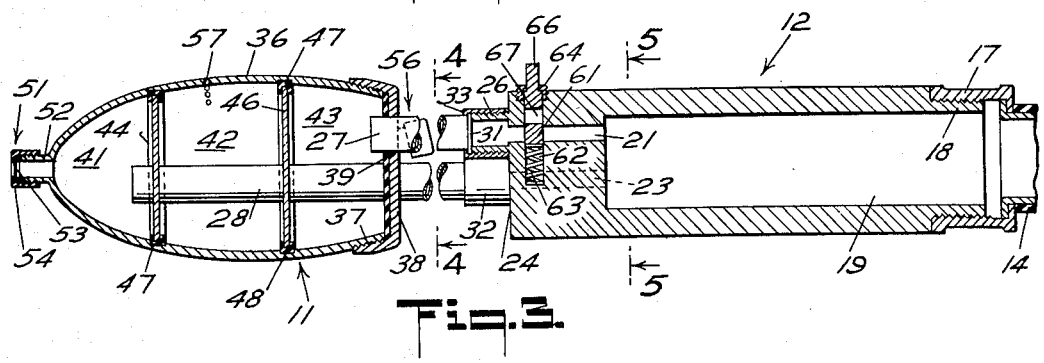
Figure 3 is a cross-sectional view taken substantially in the plane indicated by line 3—3 of Figure 2.
Figure 4:
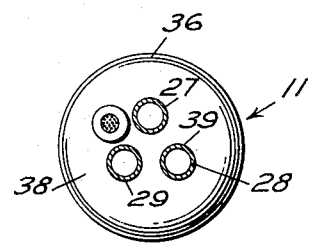
Figure 4 is a cross-sectional view taken substantially in the plane indicated by line 4—4 of Figure 3 and showing the rear end of the spraying device head.
Figure 5:
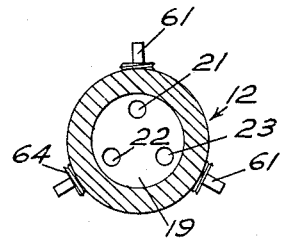
Figure 5 is a cross-sectional view taken substantially in the plane indicated by line 5—5 of Figure 3.

The top spray nozzle 56 is arranged to eject spray material in a direction generally opposite to that of nozzle 51, and may be constructed in the same manner as nozzle 51, except that it is mounted on cap 38 whereby chamber 43 may likewise be provided with a suitable discharge. However, in view of the fact that the handle is disposed in the path of the three conduits, it is preferable to offset nozzle 56 a few degrees as best indicated in Figures 2 and 3 so that the spray material will not be directed towards the conduits or the user's hand grasping handle 12.

It is believed clear that by means of nozzles 51 and 56, bi-directional spraying may be effected. To provide for lateral spraying in a direction generally normal to the axes of nozzles 51 and 56, the casing 36, adjacent chamber 42, is provided with a plurality of circumferentially spaced jet apertures 57, preferably drilled with radially extending axes whereby a generally fan-shaped lateral spray is furnished. It is apparent that the circumferential extent of the lateral spray is dependent upon the peripheral extent of apertures 57. As a practical matter, the apertures should be disposed only on one side of the casing so that the spray material will not necessarily be directed towards the legs or body of the person using the device.

In normal use, it would not be economical or practical to have the spray material simultaneously being ejected from nozzles 51 and 56 and apertures 57. I therefore provide separate valve means to regulate each of such ejectors in a rapid and simple manner. With particular reference to Figure 3, it will be seen that three plungers 61 are mounted in handle 12 which traverses each of the passages 21, 22 and 23. Each plunger is slidably mounted in a lateral bore 62 in the handle and is normally urged into fluid intercepting position by means of a spring 63 disposed within said bore, upper movement of the plunger being limited when a shoulder thereon engages a shoulder of an element 64 secured in the handle. The upper diametrically reduced portion 66 of the plunger provides a manually engageable element for depressing the plunger against spring pressure until a transverse opening 67 therein becomes aligned with its respective passage.

From the foregoing description the utility and method of operation of my device is believed clear. By pumping the tank, the spray material will be forced under pressure into chamber 19 and each of the passages, further movement being restricted by plunger 61. Assuming the user wanted to spray only with nozzle 51, he would merely depress the appropriate plunger, opening passage 21 and filling conduit 27 and chamber 41 with spray material, such material then being discharged through said nozzle. Release of the plunger would prevent further material discharge. In this manner, any one or combinations of spray nozzles may be placed in operation in a rapid and convenient manner.

I claim:

1. A spray device having a spray head, said head having means therein dividing the same into a plurality of separate substantially sealed axially spaced compartments for receiving material to be sprayed, one of said compartments having a discharge opening in substantial axial alignment with the axis of said head, another of said compartments having a discharge opening substantially axially opposed to said first mentioned opening, and another of said compartments having a discharge opening substantially normal to said head axis.

2. Apparatus of the character described including a spray head, means dividing said head into three axially spaced chambers substantially sealed from each other, an end one of said chambers having a discharge opening substantially aligned with the axis of said head, the other end chamber having a discharge opening substantially axially opposed to said first mentioned opening, an intermediate chamber having a discharge opening substantially normal to said head axis, and a plurality of substantially rigid conduits discharging into the respective chambers.

3. An apparatus as set forth in claim 2 in which the opening in said other end chamber is axially offset from the opening in said first chamber.

4. A spraying device including an axially extending spray head, means dividing said head into three axially spaced chambers substantially sealed from each other, an end one of said chambers having a discharge opening substantially aligned with the axis of said head, the other end chamber having a discharge opening substantially axially opposed to said first mentioned opening, an intermediate chamber having a discharge opening substantially normal to said head axis, three axially extending and adjacent conduits, each of said conduits opening into a respective one of said chambers, and valve means for controlling flow of material through all or selected ones of said conduits.

5. A spraying device including an axially extending spray head, said head having a substantially cylindrical casing with a closed front end and an open rear end, a rear closure member secured to said casing adjacent the rear end thereof, a pair of axially spaced sealing members disposed within said casing and cooperating with said closure member to define three axially spaced and substantially sealed chambers, means defining a spray opening in said casing for each of said chambers, three conduits, each of said conduits terminating in a respective one of said chambers, a handle member having a chamber therein and means defining three passages in communication with said latter chamber and with the respective conduits, and valve means disposed in each of said passages.

6. Apparatus as set forth in claim 5 in which said valve means includes a plunger disposed substantially normal to the axis of its respective passage, said plunger having a transverse bore therein selectively covering and uncovering said passage during axial movement of said plunger, means normally urging said plunger into a covering position, and said plunger being manually movable to passage uncovering position.

7. Apparatus as set forth in claim 5 in which two of said spray openings are directed in substantial axial opposed directions along the axis of said head, and the other of said openings is directed substantially normal to said axis.

8. A spraying device including a spray head, means dividing said head into a plurality of substantially sealed chambers, means defining a spray discharge opening for each of said chambers, said openings being angularly related to each other, a conduit for each of said chambers, and valve means for controlling flow of material in each of said conduits.

References Cited in the file of this patent

UNITED STATES PATENTS

| | | |
|---|---|---|
| 245,488 | Hamilton | Aug. 9, 1881 |
| 1,208,243 | Vondenbosch | Dec. 12, 1916 |
| 1,728,455 | Taylor et al. | Sept. 17, 1929 |
| 1,868,893 | Gentile | July 16, 1932 |
| 2,358,386 | Doll | Sept. 19, 1944 |
| 2,609,240 | Faulkner | Sept. 2, 1952 |